United States Patent
Mikasa et al.

(10) Patent No.: US 12,097,787 B2
(45) Date of Patent: Sep. 24, 2024

(54) CLUTCH UNIT

(71) Applicants: Toyota Boshoku Kabushiki Kaisha, Aichi-ken (JP); NTN CORPORATION, Osaka (JP)

(72) Inventors: Kunihiro Mikasa, Fujisawa (JP); Yasumasa Hibi, Iwata (JP); Kyohei Sasanuma, Iwata (JP); Kengo Watanabe, Iwata (JP)

(73) Assignees: Toyota Boshoku Kabushiki Kaisha, Aichi-ken (JP); NTN CORPORATION, Osaka (JP)

( * ) Notice: Subject to any disclaimer, the term of this patent is extended or adjusted under 35 U.S.C. 154(b) by 0 days.

(21) Appl. No.: 18/043,817

(22) PCT Filed: Jan. 26, 2022

(86) PCT No.: PCT/JP2022/002889
§ 371 (c)(1),
(2) Date: Nov. 16, 2023

(87) PCT Pub. No.: WO2022/163699
PCT Pub. Date: Aug. 4, 2022

(65) Prior Publication Data
US 2024/0116405 A1    Apr. 11, 2024

(30) Foreign Application Priority Data
Jan. 29, 2021 (JP) .................. 2021-013325

(51) Int. Cl.
*F16D 41/063* (2006.01)
*B60N 2/16* (2006.01)
*F16D 41/08* (2006.01)

(52) U.S. Cl.
CPC ......... *B60N 2/1635* (2013.01); *F16D 41/063* (2013.01); *F16D 41/084* (2013.01)

(58) Field of Classification Search
CPC ...... F16D 41/10; F16D 41/067; F16D 41/063; F16D 41/084; B60N 2/1635
See application file for complete search history.

(56) References Cited

U.S. PATENT DOCUMENTS 9,163,686 B2 * 10/2015 Kawai .................. F16D 67/02
2019/0210491 A1 * 7/2019 Kitayama ............ B60N 2/1892
(Continued)

FOREIGN PATENT DOCUMENTS

| JP | 2018-59596 A | 4/2018 |
| JP | 2018-032070 A | 2/2019 |

(Continued)

OTHER PUBLICATIONS

International Search Report with English translation mailed on Apr. 19, 2022 in PCT/JP2022/002889 filed on Jan. 26, 2022 (5 pages).
(Continued)

*Primary Examiner* — Lori Wu
(74) *Attorney, Agent, or Firm* — Oblon, McClelland, Maier & Neustadt, L.L.P.

(57) ABSTRACT

A clutch unit includes an operation lever, an operation member, an input-side clutch, an output-side clutch, and a bottomed cylindrical housing. The input-side clutch includes an input-side inner ring member and an operation bracket. The operation bracket includes an engagement portion that engages with the input-side inner ring member, a facing portion that faces the bottom surface of the housing with a gap therebetween, a fastened portion that penetrates a through hole formed in the bottom surface of the housing and is fastened to the operation member, and a sliding-contact portion that extends from the facing portion toward the bottom surface of the housing and comes into sliding-contact with the bottom surface of the housing.

4 Claims, 8 Drawing Sheets

(56) References Cited

U.S. PATENT DOCUMENTS

2020/0096057 A1* 3/2020 Mikasa ................ B60N 2/1685
2021/0221261 A1 7/2021 Mikasa et al.

FOREIGN PATENT DOCUMENTS

| JP | 2020-046018 A | 3/2020 |
|----|---------------|--------|
| JP | 2020-69852 A | 5/2020 |
| WO | WO 2019/230847 A1 | 12/2019 |

OTHER PUBLICATIONS

Japanese Office Action issued Jan. 23, 2024 in Japanese Patent Application No. 2021-013325, citing references 15-16 therein, 3 pages.

Extended European Search Report issued on Jun. 21, 2024 in the corresponding European patent application No. 22745918.7, citing documents 15 and 16 therein.

* cited by examiner

CLUTCH UNIT

TECHNICAL FIELD

The present disclosure relates to a clutch unit.

BACKGROUND ART

A clutch unit is known as such described in Patent Literature 1.

CITATION LIST

Patent Literature

Patent Literature 1: JP2020-069852A

SUMMARY OF INVENTION

Technical Problem

In the clutch unit disclosed in Patent Literature 1, a fastened portion of an inner-side operation bracket penetrates a through hole of a housing and is fastened to an outer-side operation bracket. However, in such a configuration, since a facing portion of the inner-side operation bracket that faces the housing is in sliding-contact with the housing, a contact area is large and a sliding resistance is large. Therefore, the present disclosure provides a clutch unit in which a sliding resistance between an operation bracket and a housing is small.

Solution to Problem

A clutch unit for use in a vehicle seat according to the present disclosure includes:
- an operation lever that is rotatable about a rotation axis;
- an output shaft member that is rotatable about the rotation axis and outputs, to a vehicle seat, an operation force applied to the operation lever;
- an operation member that rotates together with rotation of the operation lever;
- an input-side clutch that is driven by the operation member;
- an output-side clutch that transmits a rotational torque of the input-side clutch to the output shaft member and limits transmission of a rotational torque from the output shaft member to the input-side clutch; and
- a bottomed cylindrical housing that accommodates at least the input-side clutch, in which
the input-side clutch includes
  - an input-side inner ring member that rotates about the rotation axis,
  - an input-side outer ring member that rotates about the rotation axis,
  - an input-side intermediate transmission member that is rotatably provided between the input-side inner ring member and the input-side outer ring member, and transmits a rotational torque between the input-side outer ring member and the input-side inner ring member, and
  - an operation bracket that is fastened to the operation member and rotates about the rotation axis together with the operation member, and
the operation bracket includes
  - an engagement portion that engages with the input-side inner ring member or the input-side outer ring member,
  - a facing portion that faces a bottom surface of the housing with a gap therebetween,
  - a fastened portion that extends from the facing portion toward the operation member, penetrates a through hole formed in the bottom surface of the housing, and is fastened to the operation member, and
  - a sliding-contact portion that extends from the facing portion toward the bottom surface of the housing and comes into sliding-contact with the bottom surface of the housing.

Advantageous Effects of Invention

In the clutch unit according to the present disclosure, since the facing portion of the operation bracket faces the bottom surface of the housing with the gap therebetween, the facing portion does not contribute to friction between the operation bracket and the housing. Of the fastened portion and the sliding-contact portion extending from the facing portion toward the output-side clutch, the fastened portion penetrates the through hole of the housing, so the fastened portion also does not contribute to the friction between the operation bracket and the housing. Since only the sliding-contact portion comes into sliding-contact with the bottom surface of the housing, a sliding resistance between the housing and the operation bracket is limited.

DESCRIPTION OF EMBODIMENTS

Hereinafter, an embodiment of a clutch unit according to the present disclosure will be described with reference to the drawings.

Figure 1:
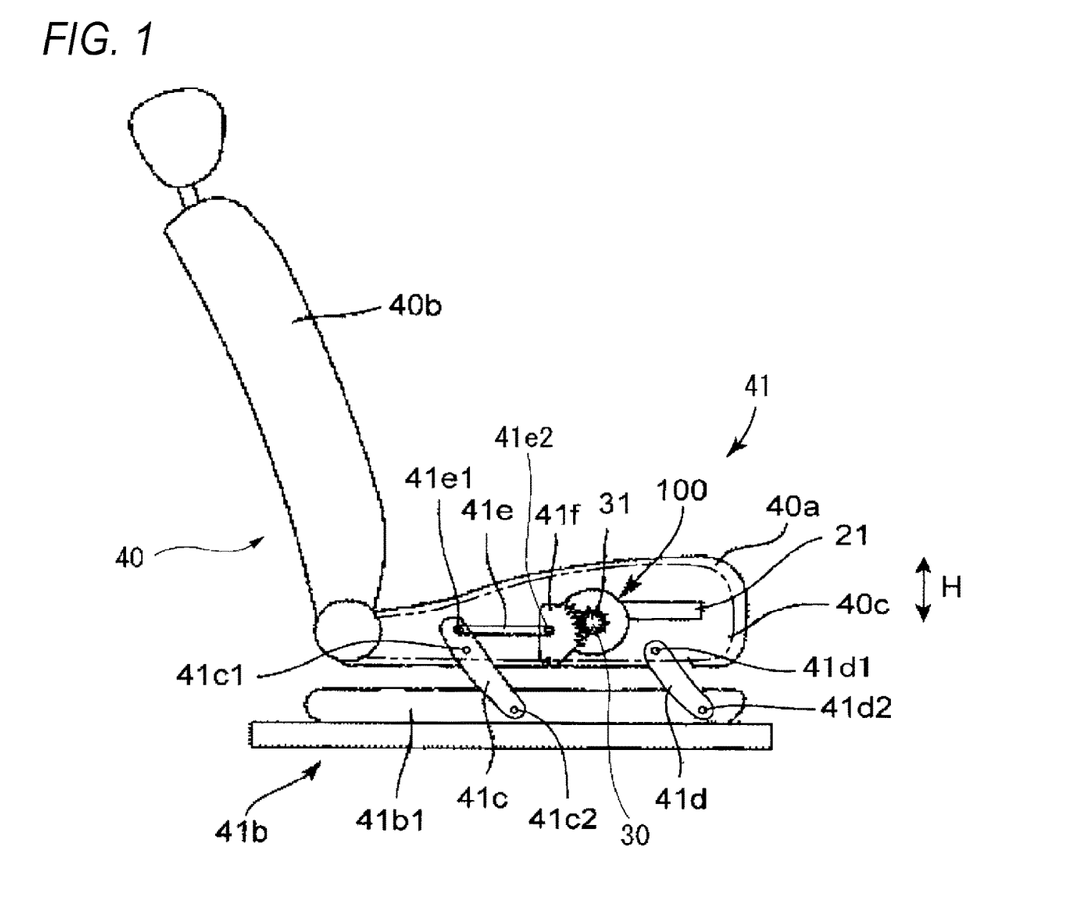
FIG. 1 is a side view showing a state in which a clutch unit according to the present embodiment is applied to a vehicle seat lifter.

FIG. 1 is a side view showing a state in which a clutch unit according to the present embodiment is applied to a vehicle seat lifter. As shown in FIG. 1, a clutch unit 100 according to the present embodiment is used in a vehicle seat 40. The vehicle seat 40 includes a seating seat 40*a*, a backrest 40*b*, and a seat frame 40*c*. The clutch unit 100 is fixed to the seat frame 40*c* of the seating seat 40*a*. A vehicle seat lifter 41 is mounted on the vehicle seat 40. The vehicle seat lifter 41 includes the clutch unit 100.

The vehicle seat lifter 41 includes a sector gear 41*f* and a link mechanism. The clutch unit 100 includes an operation lever 21 that is rotated in forward and reverse directions. A pinion gear 31, which is integral with an output shaft member 30 rotated in forward and reverse directions by the operation lever 21, meshes with the sector gear 41f of the vehicle seat lifter 41.

The link mechanism includes a first link member 41c extending substantially in an upper-lower direction, a second link member 41d extending substantially in the upper-lower direction, and a third link member 41e extending substantially horizontally.

An upper portion of the first link member 41c and an upper portion of the second link member 41d are rotatably connected to the seat frame 40c by shaft members 41c1 and 41d1, respectively. A lower portion of the first link member 41c and a lower portion of the second link member 41d are rotatably connected to a slide movable member 41b1 of a seat slide adjuster 41b by shaft members 41c2 and 41d2, respectively.

One end of the third link member 41e is connected to the first link member 41c by a shaft member 41e1 above the shaft member 41c1. The other end of the third link member 41e is rotatably connected to the sector gear 41f by a shaft member 41e2.

In FIG. 1, when the operation lever 21 is rotated counterclockwise (upward), an input torque (rotational force) in the rotation direction is transmitted to the pinion gear 31, and the pinion gear 31 rotates counterclockwise. Then, the sector gear 41f meshing with the pinion gear 31 rotates clockwise, and the third link member 41e pulls the upper portion of the first link member 41c upward. As a result, both the first link member 41c and the second link member 41d are erected, and a seating surface of the seating seat 40a is raised. After a height H of the seating seat 40a is adjusted, when a force applied to the operation lever 21 is released, the operation lever 21 rotates clockwise and returns to an original position thereof (hereinafter, referred to as a neutral position or a neutral state).

When the operation lever 21 is rotated clockwise (downward), the seating surface of the seating seat 40a is lowered by an operation opposite to the above. When the operation lever 21 is released after height adjustment, the operation lever 21 rotates counterclockwise and returns to the original position thereof (neutral position, neutral state).

In a state in which the operation lever 21 is released, the clutch unit 100 brakes rotation of the output shaft member 30 (pinion gear 31). Therefore, even when a force in the upper-lower direction is applied to the seating seat 40a, the seating seat 40a is prevented from moving in the upper-lower direction.

<Clutch Unit>

Next, the clutch unit 100 according to the present embodiment will be described. Components of the clutch unit 100 described below are basically made of metal unless otherwise specified.

Figure 2:
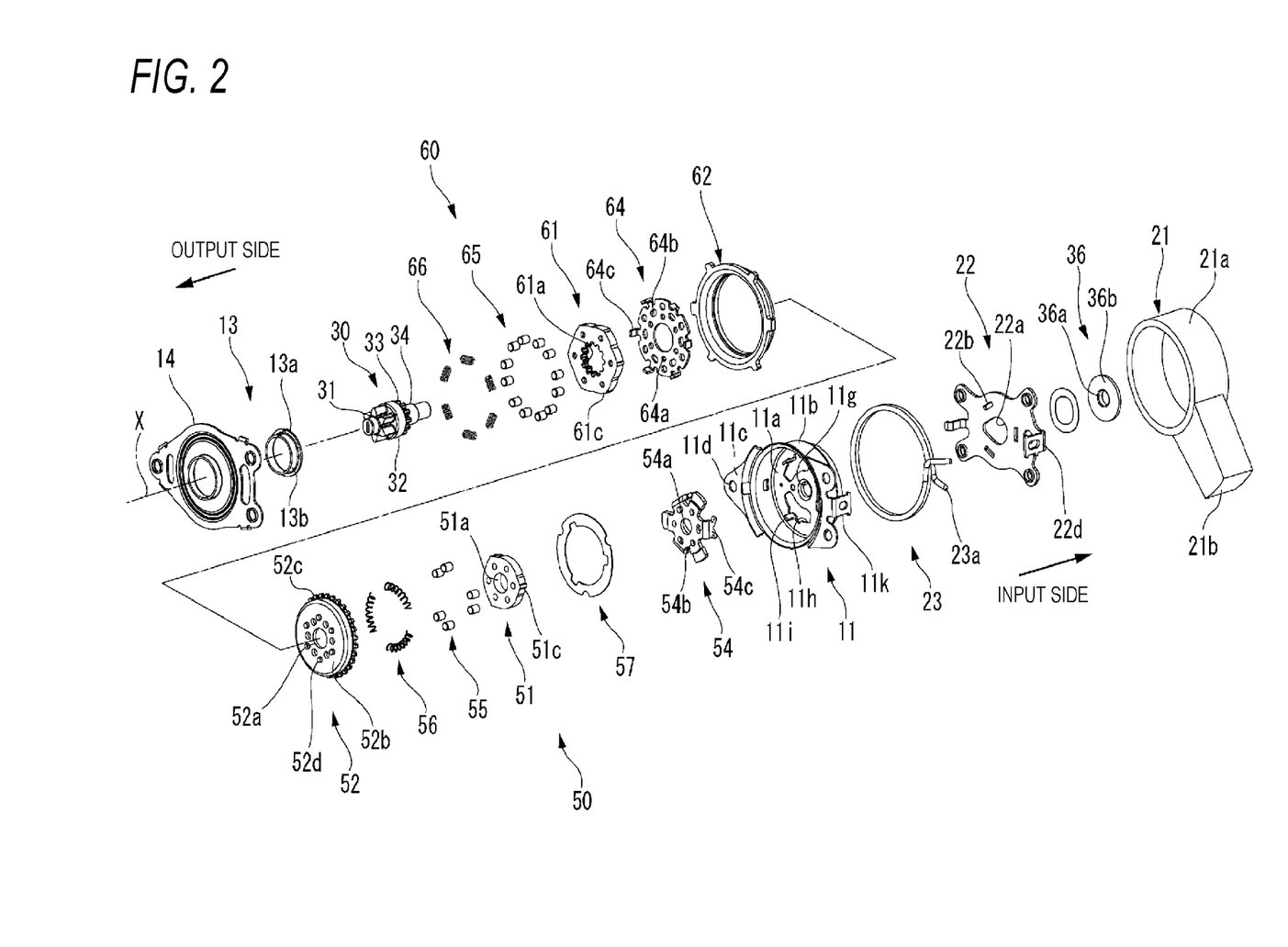
FIG. 2 is an exploded perspective view of the clutch unit.

FIG. 2 is an exploded perspective view of the clutch unit 100. As shown in FIG. 2, the clutch unit 100 includes the operation lever 21, the output shaft member 30, an input-side clutch 50, an output-side clutch 60, and a housing 11.

The input-side clutch 50 is driven (operated) by the operation lever 21 to transmit rotation of the operation lever 21 to the output shaft member 30. The output-side clutch 60 prevents the rotation of the output shaft member 30 even when a force in the upper-lower direction is applied to the seating seat 40a. The input-side clutch 50 and the output-side clutch 60 are accommodated in the housing 11. The housing 11 is a member that does not rotate when the operation lever 21 is operated.

The output shaft member 30 is a shaft member extending from a lower left side to an upper right side in FIG. 2. The output shaft member 30 is rotatable about a rotation axis X extending from the lower left side to the upper right side in FIG. 2. In the following description, a "direction of the rotation axis X" means a direction in which the output shaft member 30 extends. As shown in FIG. 2, the output shaft member 30 penetrates the output-side clutch 60 and the input-side clutch 50 in this order from a left side to a right side in FIG. 2. In the following description, the lower left side in FIG. 2 may be referred to as an output side, and the upper right side in FIG. 2 may be referred to as an input side. In the following description, a circumferential direction and a radial direction are defined with respect to the rotation axis X unless otherwise specified.

The output shaft member 30 is provided with the pinion gear 31, a large-diameter cylindrical portion 32, a spline portion 33, and a small-diameter cylindrical portion 34 in this order from the output side toward the input side.

The pinion gear 31 is provided at an output-side end of the output shaft member 30. The large-diameter cylindrical portion 32 penetrates a metal bush 13 fixed to a cover member 14 of the output-side clutch 60, which will be described later. The small-diameter cylindrical portion 34 penetrates an input-side inner ring member 51 and an input-side outer ring member 52 of the input-side clutch 50, and the housing 11, which will be described later. The spline portion 33 is spline-coupled to an output-side inner ring member 61 of the output-side clutch 60, which will be described later.

A stopper ring 36 is attached to the small-diameter cylindrical portion 34 of the output shaft member 30. The stopper ring 36 has a cylindrical fitting portion 36a and a circular plate-shaped flange portion 36b located on an output side of the fitting portion 36a. The small-diameter cylindrical portion 34 of the output shaft member 30 is fitted into the fitting portion 36a. The flange portion 36b prevents an operation plate 22, the housing 11, the input-side clutch 50, and the output-side clutch 60, which will be described later, from coming out of the output shaft member 30.

The housing 11 is a cup-shaped (bottomed cylindrical) member, and includes a bottom surface 11a and a tubular portion 11b. Two fixing flanges 11c protruding in the radial direction are formed at an output-side end of the tubular portion 11b. The fixing flange 11c has a fixing bolt insertion hole 11d. The housing 11 is fixed to the seat frame 40c by screwing bolts (not shown) inserted into the fixing bolt insertion holes 11d into screw holes of the seat frame 40c. Alternatively, the housing 11 may be fixed to the seat frame 40c by providing a crimped portion on the housing 11 and crimping the crimped portion to the seat frame 40c.

An opening of the cup-shaped housing 11 is closed by the cover member 14. In the present embodiment, the input-side clutch 50 and the output-side clutch 60 are accommodated in a space formed by the housing 11 and the cover member.

The housing 11 is provided with a spring locking piece 11k. The spring locking piece 11k extends toward the input side.

A tubular bearing 11g is formed in a central portion of the bottom surface 11a in the radial direction by burring. The bearing 11g extends from the bottom surface 11a toward the input side. The bearing 11g rotatably supports the output shaft member 30 with respect to the housing 11. The bottom surface 11a has three windows 11h respectively formed of arc-shaped elongated holes and three protruding pieces 11i respectively extending from edges of the windows 11h toward the output side.

The operation lever 21 is made of synthetic resin, for example, and is fixed to the operation plate 22, which will be described later. The operation lever 21 includes a fixed portion 21*a* fixed to the operation plate 22, and a rod-shaped grip portion 21*b* extending outward in the radial direction from the fixed portion 21*a*.

The operation plate 22 is provided between the housing 11 and the operation lever 21 in the direction of the rotation axis X. When an operator grips the grip portion 21*b* of the operation lever 21 and rotates the operation lever 21 in the forward and reverse directions about the rotation axis X, the operation plate 22 rotates in the forward and reverse directions integrally with the operation lever 21.

The operation plate 22 has an insertion hole 22*a* at a center thereof in the radial direction. The small-diameter cylindrical portion 34 of the output shaft member 30 is inserted through the insertion hole 22*a*. The operation plate 22 has three rectangular engagement holes 22*b* around the insertion hole 22*a*. Claw portions 54*c* of an operation bracket 54, which will be described later, are respectively inserted into the engagement holes 22*b*, and the operation lever 21 rotates together with the operation bracket 54 via the operation plate 22.

An operation piece 22*d* is provided on an outer peripheral edge of the operation plate 22. The operation piece 22*d* extends toward the output side.

A return spring 23 is provided on an outer periphery of the housing 11. The return spring 23 is a spring that returns the operation lever 21 and the operation plate 22 to a neutral position when no operation force is applied to the operation lever 21. The return spring 23 is, for example, an arc-shaped helical spring formed by bringing both free end portions 23*a* close to each other. Both the free end portions 23*a* of the return spring 23 are locked to the spring locking piece 11*k* of the housing 11 and the operation piece 22*d* of the operation plate 22.

In a state (neutral state) in which the operator does not apply an operation force to the operation lever 21, the pair of free end portions 23*a* of the return spring 23 both abut the spring locking piece 11*k* and the operation piece 22*d*, and the operation lever 21 is supported at the neutral position. When the operator rotates the operation lever 21 in the forward and reverse directions about the rotation axis X, the operation plate 22 rotates with respect to the housing 11 together with the operation lever 21. Then, one free end portion 23*a* of the pair of free end portions 23*a* maintains a state of engagement with the spring locking piece 11*k* of the housing 11, and the other free end portion 23*a* engages with the operation piece 22*d* of the operation plate 22, and moves in a direction away from the one free end portion 23*a* against an elastic restoring force of the return spring 23. Therefore, the return spring 23 is bent and a return force to the neutral position is applied.

<Input-Side Clutch>

The input-side clutch 50 includes the input-side inner ring member 51, the input-side outer ring member 52, an operation bracket 54 (an example of an operation member), input-side clutch rollers 55 (examples of input-side transmission members), and input-side roller biasing springs 56.

The input-side inner ring member 51 is a cylindrical member extending in the direction of the rotation axis X. The input-side inner ring member 51 has, at a center thereof, an insertion hole 51*a* through which the small-diameter cylindrical portion 34 of the output shaft member 30 is inserted.

Three wedge cam portions 51*c* bulging outward are formed at equal intervals on an outer peripheral edge of the input-side inner ring member 51. Three protrusions 51*b* are formed on an input-side surface of the input-side inner ring member 51.

The operation bracket 54 is a plate-shaped member. The operation bracket 54 has, at a center in the radial direction, an insertion hole 54*a* through which the small-diameter cylindrical portion 34 of the output shaft member 30 is inserted. The operation bracket 54 has three fitting holes 54*b* (see FIG. 2) into which the protrusions 51*b* of the input-side inner ring member 51 are fitted. According to a fitting structure of the protrusions 51*b* of the input-side inner ring member 51 and the fitting holes 54*b*, the input-side inner ring member 51 and the operation bracket 54, which are separate from each other, are connected to each other so as to rotate integrally with each other and to be relatively movable in the direction of the rotation axis X.

Three claw portions 54*c* are provided on an outer peripheral edge of the operation bracket 54. The claw portions 54*c* penetrate the windows 11*h* formed in the bottom surface 11*a* of the housing 11, and are fitted into the engagement holes 22*b* of the operation plate 22, respectively. Accordingly, the operation bracket 54 is connected to the operation plate 22 and rotates integrally with the operation plate 22.

The input-side outer ring member 52 is a dish-shaped member. The input-side outer ring member 52 includes a bottom portion 52*b*, an outer ring portion 52*c*, and fixing portions 52*d*. The bottom portion 52*b* is a circular plate-shaped portion. An insertion hole 52*a* through which the small-diameter cylindrical portion 34 of the output shaft member 30 is inserted is formed at a center of the bottom portion 52*b* in the radial direction. The outer ring portion 52*c* is a cylindrical portion extending from an outer edge portion of the bottom portion 52*b* toward the input side. The bottom portion 52*b* is provided on an output side of the outer ring portion 52*c*. The fixing portions 52*d* are protrusions protruding from the bottom portion 52*b* toward the output side. The fixing portions 52*d* are coupled to a release bracket 64 of the output-side clutch 60, which will be described later.

Figure 3:
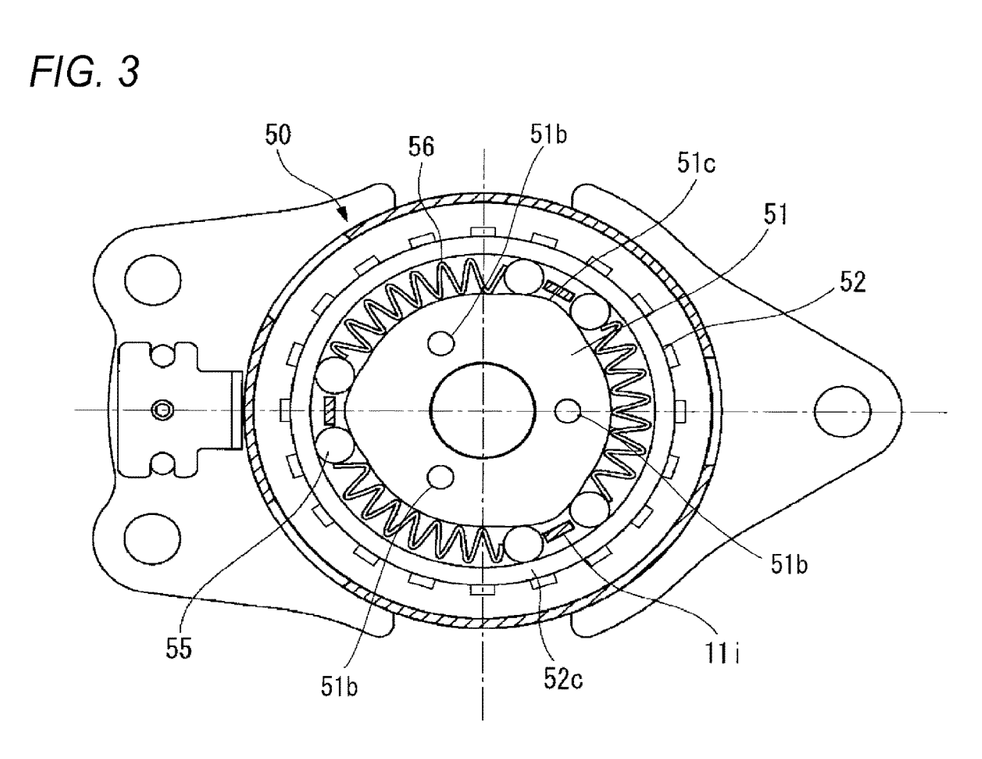
FIG. 3 is a view showing an input-side clutch in a neutral state.

FIG. 3 shows the input-side clutch 50 in the neutral state.

As shown in FIG. 3, a gap is formed between an inner peripheral surface of the input-side outer ring member 52 and an outer peripheral surface of the input-side inner ring member 51. The inner peripheral surface of the input-side outer ring member 52 is a circumferential surface, whereas the outer peripheral surface of the input-side inner ring member 51 is provided with the three wedge cam portions 51*c* bulging outward. Therefore, spaces whose both ends in the radial direction are tapered in a wedge shape are formed in the gap between the inner peripheral surface of the input-side outer ring member 52 and the outer peripheral surface of the input-side inner ring member 51. The protruding pieces 11*i* of the housing 11 protrude into the gap. When the input-side inner ring member 51 is rotated by the operation lever 21, the protruding pieces 11*i* restrict movement of the input-side clutch rollers 55.

The input-side clutch 50 includes six input-side clutch rollers 55 and three input-side roller biasing springs 56. The input-side clutch rollers 55 and the input-side roller biasing spring 56 are disposed between the outer peripheral surface of the input-side inner ring member 51 and the inner peripheral surface of the outer ring portion 52*c* of the input-side outer ring member 52.

The input-side roller biasing spring 56 is disposed between the wedge cam portions 51*c* of the input-side inner ring member 51 in the circumferential direction. A pair of input-side clutch rollers 55 are disposed on both sides of the wedge cam portion 51*c* of the input-side inner ring member 51. The protruding piece 11*i* of the housing 11 is disposed between the pair of input-side clutch rollers 55. That is, in the gap between the input-side inner ring member 51 and the input-side outer ring member 52, the input-side roller biasing spring 56, the input-side clutch roller 55, the protruding piece 1li, and the input-side clutch roller 55 are provided counterclockwise in this order.

<Operation of Input-Side Clutch>

As shown in FIG. 3, in the neutral state, in the input-side clutch 50, the input-side clutch roller 55 is in contact with the input-side roller biasing spring 56, and the input-side clutch roller 55 is biased toward a top portion of the wedge cam portion 51c by the input-side roller biasing spring 56. Therefore, in the neutral state, the input-side clutch roller 55 is bitten between the input-side inner ring member 51 and the input-side outer ring member 52.

In this neutral state, for example, when the operator rotates the operation lever 21 counterclockwise from the neutral position (a position of the operation lever 21 in a no-load state), rotation of the operation lever 21 is transmitted to the input-side inner ring member 51 via the operation plate 22 and the operation bracket 54. That is, the input-side inner ring member 51 tends to rotate counterclockwise together with the operation lever 21.

The input-side clutch roller 55 is provided in a wedge-shaped space narrowed clockwise between the input-side inner ring member 51 and the input-side outer ring member 52. When the input-side inner ring member 51 tends to rotate counterclockwise, the outer peripheral surface of the input-side inner ring member 51 applies a force to bite input-side clutch roller 55 in the wedge-shaped space narrowed clockwise. When receiving such a force, the input-side clutch roller 55 applies a force having a component pressing the inner peripheral surface of the input-side outer ring member 52 outward in the radial direction and a component pressing the inner peripheral surface of the input-side outer ring member 52 counterclockwise. The input-side clutch roller 55 applies a counterclockwise pressing force to the input-side outer ring member 52. In this way, when the input-side inner ring member 51 rotates counterclockwise, the input-side outer ring member 52 rotates counterclockwise together with the input-side clutch rollers 55.

<Output-Side Clutch>

With reference back to FIG. 2, the output-side clutch 60 includes the output-side inner ring member 61, an output-side outer ring member 62, the release bracket 64, output-side clutch rollers 65, and output-side roller biasing springs 66.

The output-side outer ring member 62 is a substantially cylindrical member. The output-side outer ring member 62 is coaxial with the output shaft member 30 and is rotatable relative to the output-side inner ring member 61. The output-side outer ring member 62 is disposed on an outer peripheral side of the output-side inner ring member 61.

The output-side inner ring member 61 is coaxial with the output shaft member 30 and rotates integrally with the output shaft member 30. The output-side inner ring member 61 has a diameter smaller than that of the output-side outer ring member 62.

A plurality of grooves are formed in an inner peripheral surface of the output-side inner ring member 61, and serve as a spline portion 61a to which the spline portion 33 of the output shaft member 30 is coupled. Six protrusions 61b are formed on an input-side surface of the output-side inner ring member 61 (see FIG. 4). In FIG. 2, recesses, which are traces left when the protrusions 61b are formed by press working, are visible on an output-side surface. Six wedge cam portions 61c bulging outward are formed at equal intervals on an outer peripheral portion of the output-side inner ring member 61.

The release bracket 64 is a substantially circular plate-shaped member, and is disposed on an input side of the output-side inner ring member 61. The release bracket 64 can transmit a force applied from the input-side clutch 50 to the output-side clutch rollers 65. An outer diameter of the release bracket 64 is larger than an outer diameter of the output-side inner ring member 61 and smaller than an inner diameter of the output-side outer ring member 62. The release bracket 64 is a member separate from the output-side inner ring member 61, the output-side outer ring member 62, the input-side inner ring member 51, and the input-side outer ring member 52.

A plurality of first engagement holes 64a are formed in the release bracket 64. The fixing portions 52d of the input-side outer ring member 52 are respectively inserted into the first engagement holes 64a. Accordingly, the release bracket 64 is rotatable together with the input-side outer ring member 52.

The output-side inner ring member 61 is provided with the protrusions 61b (see FIG. 4) protruding toward the input side. The release bracket 64 has a plurality of elongated holes 64b into which the protrusions 61b are respectively inserted. The elongated holes 64b extend in the circumferential direction. The protrusions 61b are slightly displaceable in the circumferential direction in the elongated holes 64b, respectively. That is, the release bracket 64 and the output-side inner ring member 61 are relatively rotatable within a range in which the protrusions 61b are respectively displaced in the elongated holes 64b.

Six claw portions 64c extending toward the output side are provided on an outer peripheral edge of the release bracket 64. The claw portion 64c is provided between a pair of output-side clutch rollers 65.

Figure 4:
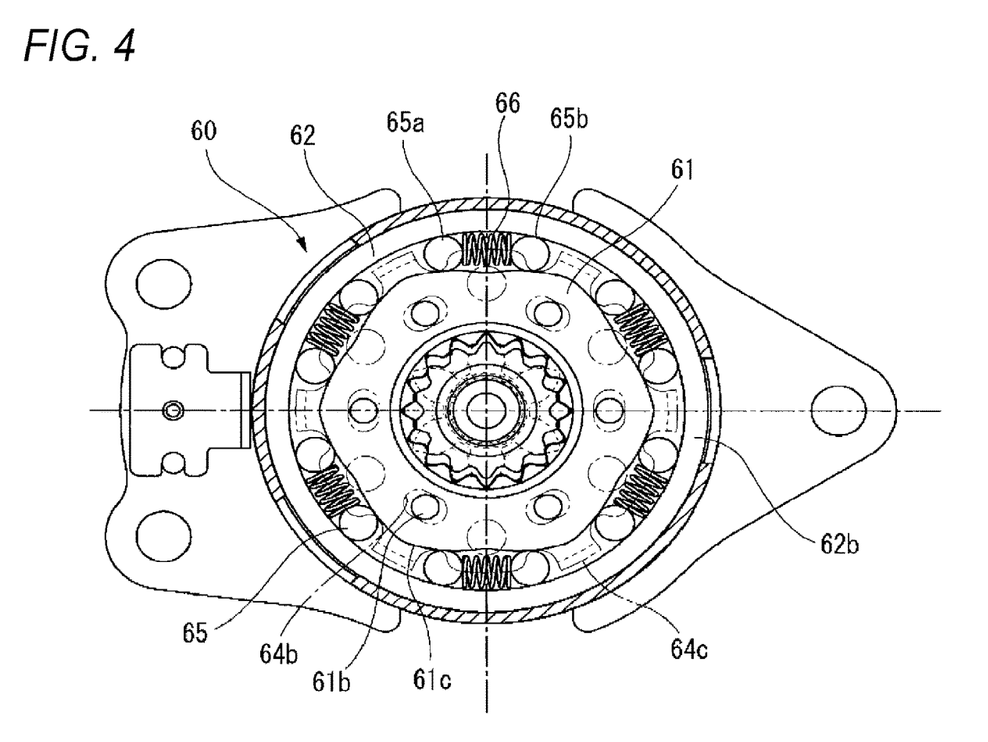
FIG. 4 is a view showing an output-side clutch in the neutral state.

FIG. 4 shows the output-side clutch 60 in the neutral state. As shown in FIG. 4, a gap is formed between an inner peripheral surface of the output-side outer ring member 62 and an outer peripheral surface of the output-side inner ring member 61. The inner peripheral surface of the output-side outer ring member 62 is a circumferential surface, whereas the outer peripheral surface of the output-side inner ring member 61 is provided with the wedge cam portions 61c bulging outward. Therefore, spaces whose both ends in the radial direction are tapered in a wedge shape are formed in the gap between the inner peripheral surface of the output-side outer ring member 62 and the outer peripheral surface of the output-side inner ring member 61. The claw portions 64c of the release bracket 64 protrude into the gap having the paces. When the release bracket 64 is rotated, the claw portions 64c move inside the gap.

The output-side clutch 60 includes 12 output-side clutch rollers 65 and six output-side roller biasing springs 66. The output-side clutch rollers 65 and the output-side roller biasing springs 66 are disposed in the gap between the outer peripheral surface of the output-side inner ring member 61 and the inner peripheral surface of the output-side outer ring member 62. The output-side clutch rollers 65 are members that are disposed between the outer peripheral surface of the output-side inner ring member 61 and the inner peripheral surface of the output-side outer ring member 62 and can transmit a rotational force between the output-side inner ring member 61 and the output-side outer ring member 62. A circumferential surface of the cylindrical output-side clutch roller 65 abuts the claw portion 64c of the release bracket 64.

The output-side roller biasing spring 66 is disposed between the wedge cam portions 61c of the output-side inner ring member 61 in the circumferential direction. A pair of output-side clutch rollers 65 are disposed on both sides of the wedge cam portion 61c of the output-side inner ring member 61. The claw portion 64c of the release bracket 64 is disposed between the pair of output-side clutch rollers 65. The output-side clutch roller 65 is biased toward a top portion of the wedge cam portion 61c by the output-side roller biasing spring 66. In the gap between the output-side inner ring member 61 and the output-side outer ring member 62, the claw portion 64c, the output-side clutch roller 65, the output-side roller biasing spring 66, and the output-side clutch roller 65 are provided counterclockwise in this order.

<Operation of Output-Side Clutch>

FIG. 4 shows the output-side clutch 60 in the neutral state. As shown in FIG. 4, in the neutral state, in the output-side clutch 60, the output-side clutch roller 65 is biased toward the top portion of the wedge cam portion 61c by the output-side roller biasing spring 66. Accordingly, the output-side clutch roller 65 is bitten in the wedge-shaped space between the wedge cam portion 61c of the output-side inner ring member 61 and the inner peripheral surface of the output-side outer ring member 62.

A first output-side clutch roller 65a and a second output-side clutch roller 65b located on a clockwise side via the first output-side clutch roller 65a and the output-side roller biasing spring 66 will be described more specifically.

The gap where the first output-side clutch roller 65a is located is tapered counterclockwise. The first output-side clutch roller 65a is biased counterclockwise by the output-side roller biasing spring 66. Therefore, the first output-side clutch roller 65a is bitten counterclockwise between the output-side inner ring member 61 and the output-side outer ring member 62.

The gap where the second output-side clutch roller 65b is located is tapered clockwise. The second output-side clutch roller 65b is biased clockwise by the output-side roller biasing spring 66. Therefore, the second output-side clutch roller 65b is bitten clockwise between the output-side inner ring member 61 and the output-side outer ring member 62.

Here, the output-side outer ring member 62 is immovable with respect to the housing 11. The first output-side clutch roller 65a and the second output-side clutch roller 65b are bitten counterclockwise and clockwise between both the output-side inner ring member 61 and the output-side outer ring member 62. Therefore, the output-side inner ring member 61 and the output-side outer ring member 62 cannot rotate. As a result, the output shaft member 30 spline-coupled to the output-side inner ring member 61 cannot rotate.

In this way, in the neutral state, since the output-side inner ring member 61 and the output-side outer ring member 62 are in a non-rotatable state, the output shaft member 30 does not rotate even when a rotational force is applied to the output shaft member 30 from a side close to the vehicle seat 40. Accordingly, the vehicle seat 40 is fixed while the height thereof is maintained.

Next, a case where the output-side clutch 60 rotates the output shaft member 30 will be described.

When the operation lever 21 is rotated counterclockwise, the input-side outer ring member 52 of the input-side clutch 50 rotates counterclockwise as described above. The input-side outer ring member 52 is spline-coupled to the release bracket 64. Therefore, when the operation lever 21 is rotated counterclockwise, the release bracket 64 also rotates counterclockwise.

The release bracket 64 is coupled to the protrusions 61b of the output-side inner ring member 61 via the elongated holes 64b. Therefore, the release bracket 64 (1) first rotates counterclockwise in a state in which the output-side inner ring member 61 does not rotate, and (2) rotates counterclockwise together with the output-side inner ring member 61 after the protrusions 61b respectively abut edges of the elongated holes 64b.

(1) When the release bracket 64 rotates counterclockwise in the state in which the output-side inner ring member 61 does not rotate, the claw portion 64c of the release bracket 64 presses the output-side clutch roller 65 counterclockwise. Then, an abutment state of the output-side clutch roller 65 between the output-side inner ring member 61 and the output-side outer ring member 62, in which the output-side clutch roller 65 is bitten in the wedge-shaped space narrowed clockwise between the output-side inner ring member 61 and the output-side outer ring member 62, is released.

When the output-side inner ring member 61 tends to rotate counterclockwise, the output-side clutch roller 65, which is bitten in the wedge-shaped space narrowed counterclockwise between the output-side inner ring member 61 and the output-side outer ring member 62, is not subjected to a frictional force between the output-side clutch roller 65 and the output-side inner ring member 61, and an abutment state with the output-side inner ring member 61 is released.

In this way, in a state in which the abutment state of the output-side clutch roller 65 between the output-side inner ring member 61 and the output-side outer ring member 62 is released, the output-side inner ring member 61 is rotatable relative to the output-side outer ring member 62.

After the output-side inner ring member 61 becomes rotatable relative to the output-side outer ring member 62, (2) the protrusions 61b of the output-side inner ring member 61 respectively abut the edges of the elongated holes 64b of the release bracket 64. Then, the output-side inner ring member 61 rotates counterclockwise together with the release bracket 64.

In this way, the output-side clutch 60 does not rotate the output shaft member 30 when no operation force is applied to the operation lever 21 in the neutral state, and rotates the output shaft member 30 only when an operation force is applied to the operation lever 21.

As described above, the clutch unit 100 for use in the vehicle seat 40 according to the present embodiment includes:

the operation lever 21 rotatable about the rotation axis X;

the output shaft member 30 that is rotatable about the rotation axis X and outputs, to the vehicle seat 40, an operation force applied to the operation lever 21;

the operation plate 22 (operation member) that rotates together with rotation of the operation lever 21;

the input-side clutch 50 that is driven by the operation plate 22;

the output-side clutch 60 that transmits a rotational torque of the input-side clutch 50 to the output shaft member 30 and limits transmission of a rotational torque from the output shaft member 30 to the input-side clutch 50; and the bottomed cylindrical housing 11 that accommodates at least the input-side clutch 50.

The input-side clutch 50 includes the input-side inner ring member 51 that rotates about the rotation axis X, the input-side outer ring member 52 that rotates about the rotation axis X, the input-side clutch roller 55 (input-side intermediate transmission member) that is rotatably provided between the input-side inner ring member 51 and the input-side outer ring member 52, and transmits a rotational torque between the input-side outer ring member 52 and the input-side inner ring member 51, and the operation bracket 54 that is fastened to the operation plate 22 and rotates about the rotation axis X together with the operation plate 22.

<Operation Bracket 54, Operation Plate 22, and Housing 11>

Figure 5:
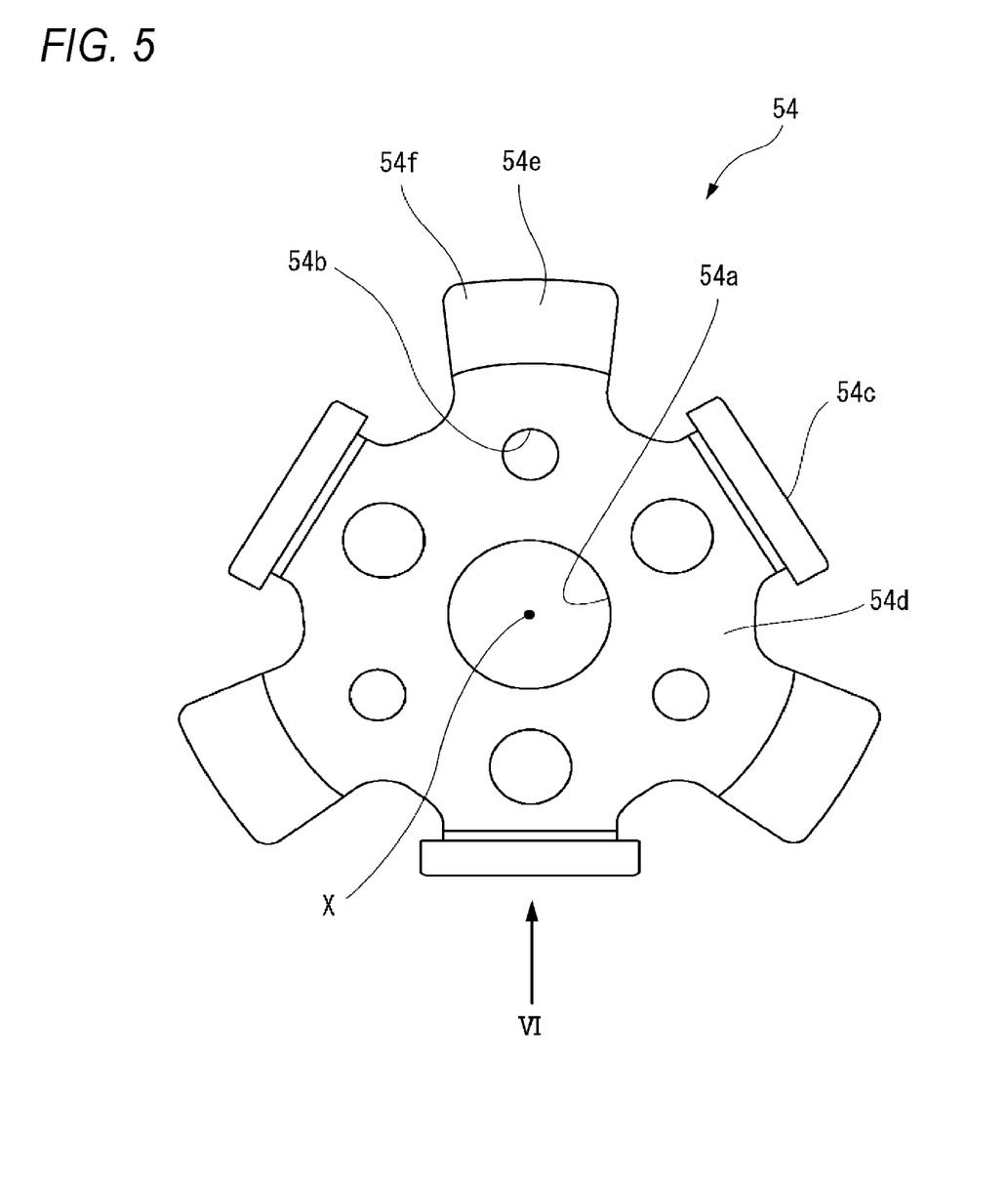
FIG. 5 is a view of an operation bracket as viewed from a side close to an operation lever.
Figure 6:
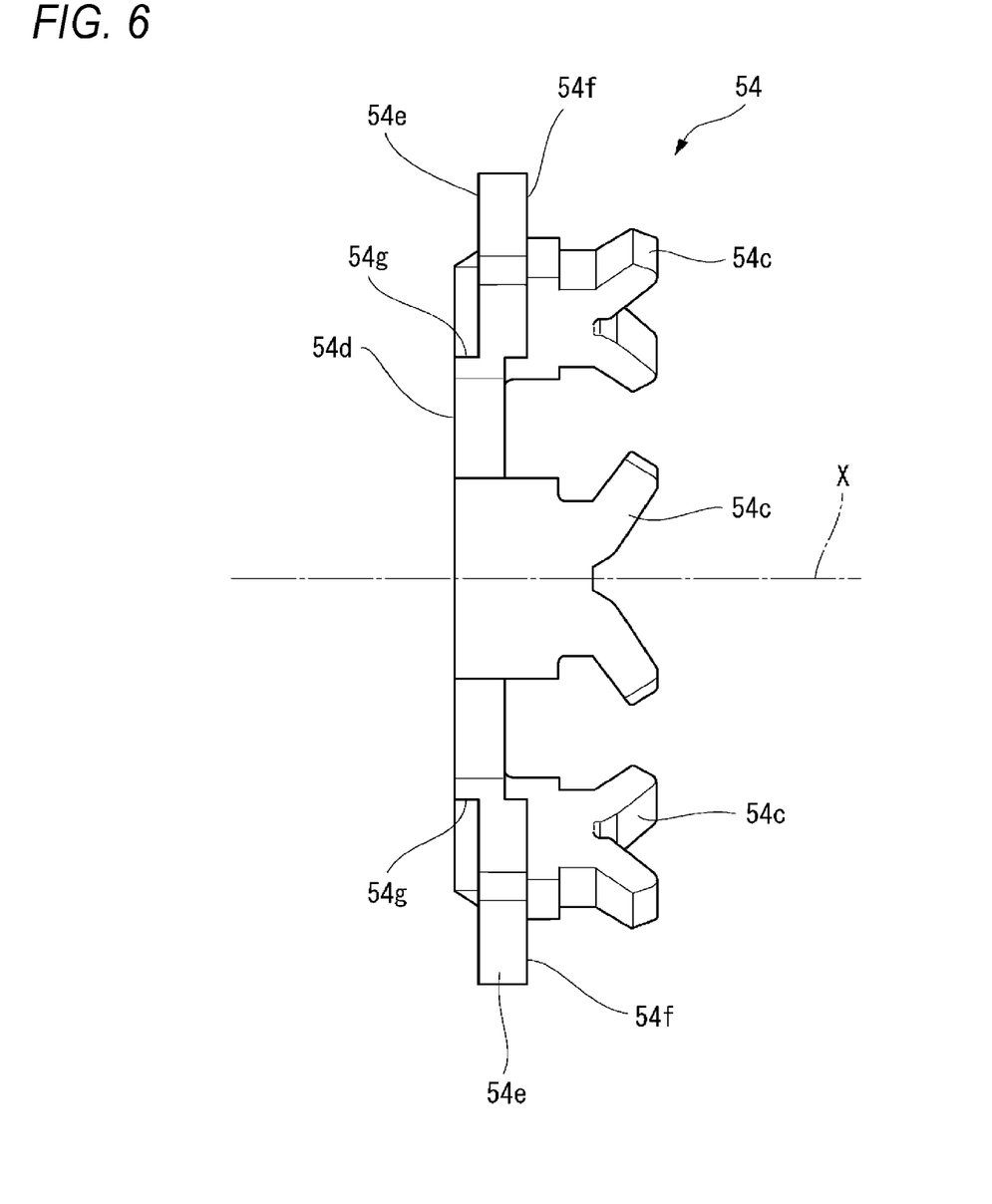
FIG. 6 is a view of the operation bracket as viewed from a direction VI in FIG. 5.

FIG. 5 is a view of the operation bracket 54 as viewed from a side close to the operation lever 21. FIG. 6 is a view of the operation bracket 54 as viewed from a direction VI in FIG. 5.

As described above, the operation bracket 54 is a plate-shaped member. The operation bracket 54 has, at a center in the radial direction, an insertion hole 54a through which the small-diameter cylindrical portion 34 of the output shaft member 30 is inserted. The operation bracket 54 has the three fitting holes 54b (engagement portions) into which the protrusions of the input-side inner ring member 51 are fitted. According to the fitting structure of the protrusions 51b of the input-side inner ring member 51 and the fitting holes 54b, the input-side inner ring member 51 and the operation bracket 54, which are separate from each other, are connected to each other so as to rotate integrally with each other and to be relatively movable in the direction of the rotation axis X.

The three claw portions 54c (fastened portions) are provided on the outer peripheral edge of the operation bracket 54. The claw portions 54c penetrate the windows 11h formed in the bottom surface 11a of the housing 11, and are fitted into the engagement holes 22b of the operation plate 22, respectively. Accordingly, the operation bracket 54 is connected to the operation plate 22 and rotates integrally with the operation plate 22.

The operation bracket 54 further includes a facing portion 54d and sliding-contact portions 54e.

The facing portion 54d is a plate-shaped portion extending in the radial direction of the rotation axis X. Fitting holes 54b are formed in the facing portion 54d. The claw portions 54c and the sliding-contact portions 54e are provided on a radially outer edge of the facing portion 54d. In the shown example, the three claw portions 54c and three sliding-contact portions 54e are provided on the operation bracket 54.

As shown in FIG. 6, the claw portion 54c extends from the outer edge of the facing portion 54d toward the input side. In the shown example, tip ends of the claw portion 54c have a two-forked shape, and the tip ends extend in directions away from each other.

The sliding-contact portion 54e extends from the outer edge of the facing portion 54d toward the input side, and then extends in the radial direction of the rotation axis X. In the direction of the rotation axis X, a tip end portion of the sliding-contact portion 54e is located on an input side of the facing portion 54d.

Figure 7:
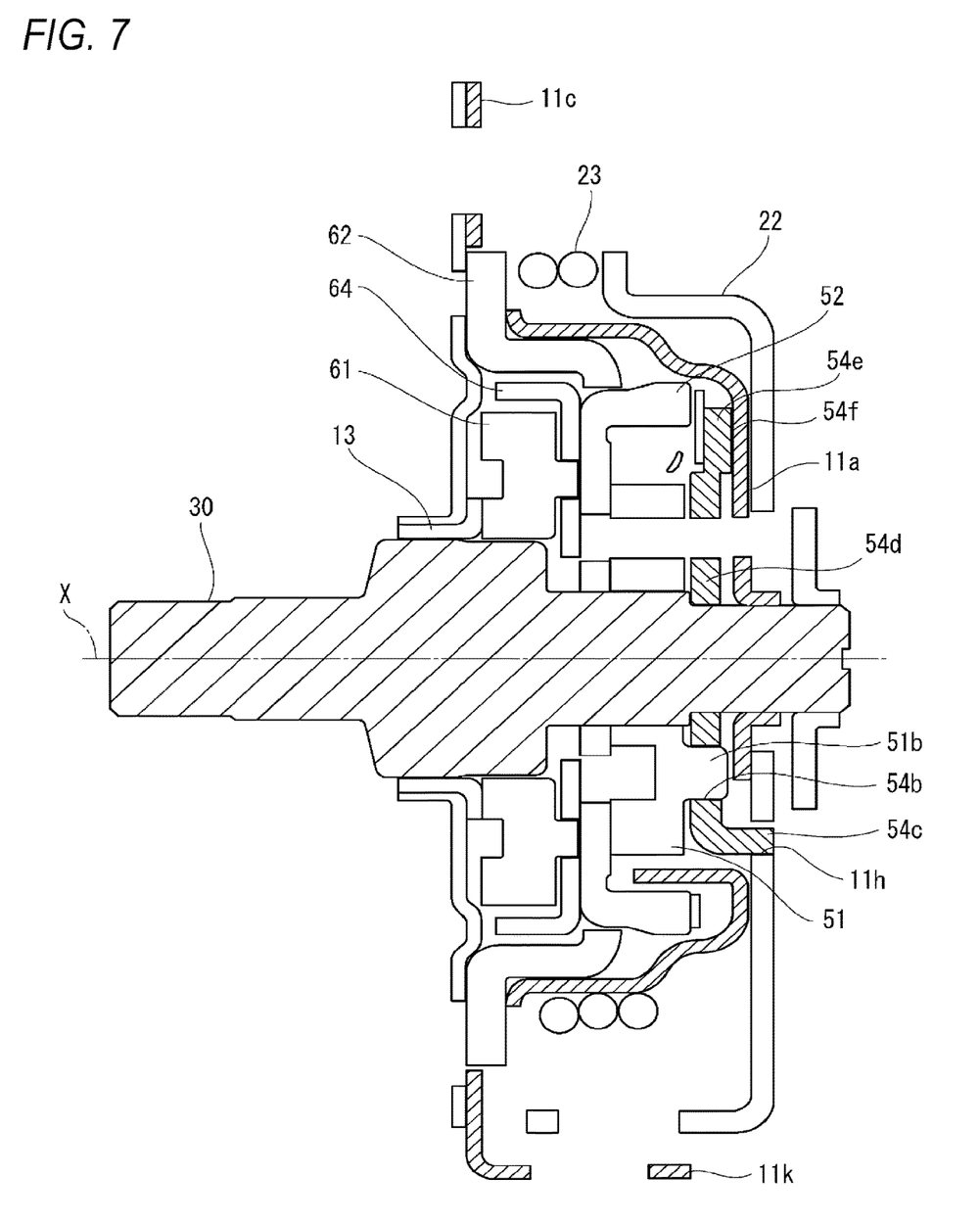
FIG. 7 is a cross-sectional view of the clutch unit.

FIG. 7 is a cross-sectional view of the clutch unit 100. As shown in FIG. 7, the facing portion 54d faces the bottom surface 11a of the housing 11 with a gap therebetween. The claw portions 54c extend from the facing portion 54d toward the operation lever 21, respectively penetrate the windows 11h (through holes) formed in the bottom surface 11a of the housing 11, and are fastened to the operation plate 22. The sliding-contact portions 54e extend from the facing portion 54d toward the bottom surface 11a of the housing 11 and come into sliding-contact with the bottom surface 11a of the housing 11.

According to the clutch unit 100 of the present embodiment as described above, since the facing portion 54d of the operation bracket 54 faces the bottom surface 11a of the housing 11 with the gap therebetween, the facing portion 54d does not contribute to friction between the operation bracket 54 and the housing 11. Of the claw portions 54c (fastened portion) and the sliding-contact portions 54e extending from the facing portion 54d toward the operation lever 21, the claw portions 54c respectively penetrate the windows 11h (through holes) of the housing 11, so the claw portions 54c also do not contribute to the friction between the operation bracket 54 and the housing 11. Since only the sliding-contact portions 54e come into sliding-contact with the bottom surface 11a of the housing 11, a sliding resistance between the housing 11 and the operation bracket 54 is limited.

In the clutch unit 100 according to the present embodiment, the sliding-contact portion 54e extends from an outer end portion of the facing portion 54d in the radial direction of the rotation axis X toward the operation lever 21.

Since the sliding-contact portion 54e is provided at a position away from the rotation axis X, a load acting on the sliding-contact portion 54e can be reduced when a force twisting the operation lever 21 is applied to the sliding-contact portion 54e.

As shown in FIG. 5, in the clutch unit 100 according to the present embodiment, the sliding-contact portion 54e includes a sliding-contact surface portion 54f extending outward in the radial direction of the rotation axis X.

In the shown example, the sliding-contact portion 54e includes the sliding-contact surface portion 54f and a connection portion 54g connecting the sliding-contact surface portion 54f and the facing portion 54d. The sliding-contact surface portion 54f is located closer to the operation lever 21 than the facing portion 54d in the direction of the rotation axis X. A surface of the sliding-contact surface portion 54f on a side close to the operation lever 21 comes into sliding-contact with the bottom surface 11a of the housing 11.

Figure 8:
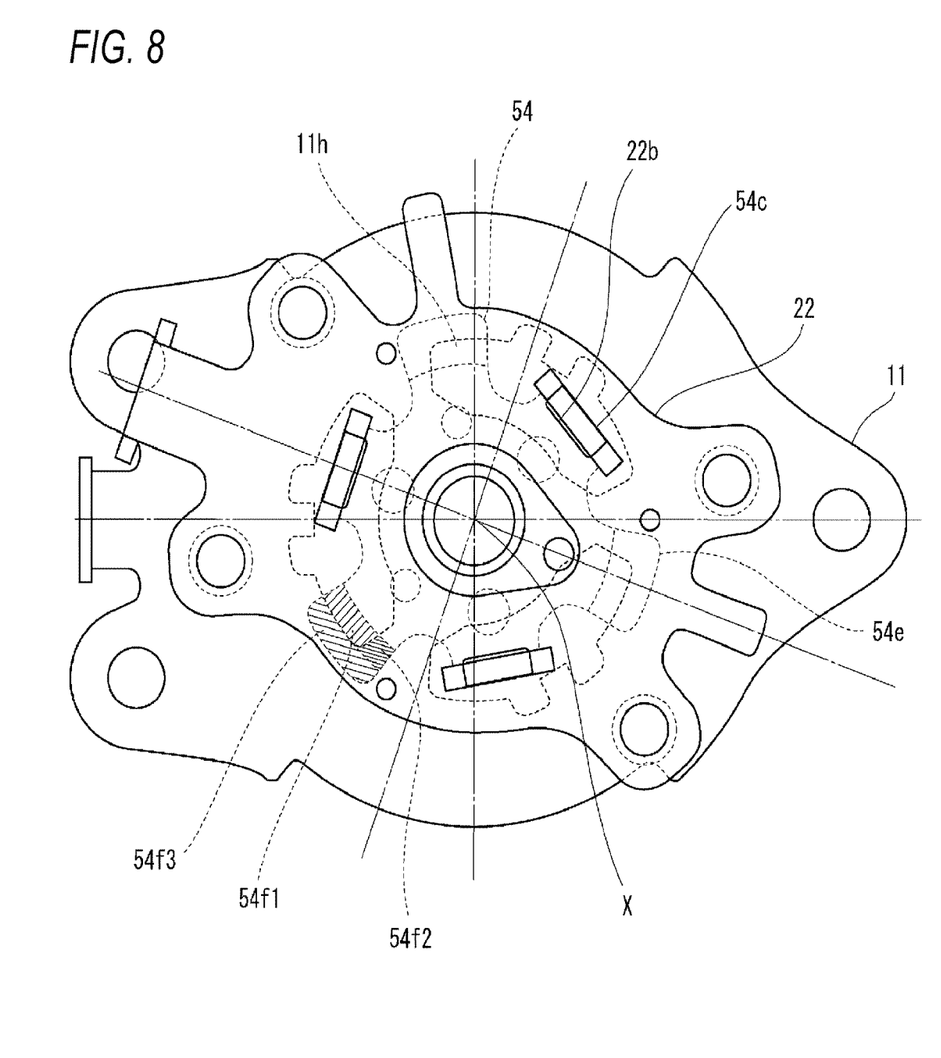
FIG. 8 is a view showing overlapping of an operation plate, a housing, and the operation bracket.

FIG. 8 is a view showing overlapping of the operation plate 22, the housing 11, and the operation bracket 54. FIG. 8 shows how the three members overlap when the operation lever 21 is rotated to the maximum movable range. As shown in FIG. 8, a part 54f1 of the sliding-contact surface portion 54f overlaps the window 11h formed in the bottom surface 11a of the housing 11.

According to the clutch unit 100 of the present embodiment, when the operation lever 21 is rotated to the maximum movable range, only the part 54f1 of the sliding-contact surface portion 54f overlaps the window 11h, and another part 54f2 of the sliding-contact surface portion 54f overlaps the bottom surface 11a of the housing 11 without overlapping the window 11h. The part 54f2 overlapping the bottom surface 11a of the housing 11 prevents the sliding-contact portion Me from coming off the window 11h.

When a hand is released from the operation lever 21 and the operation lever 21 returns to an initial position from the state shown in FIG. 8, the part 54f1 of the sliding-contact surface portion 54f overlapping the window 11h comes into sliding-contact with the bottom surface 11a. Different from the present embodiment, when a sliding-contact surface is normally provided only at a position not overlapping the through hole (when there is no technical idea of overlapping a part of the sliding-contact surface portion with the window) while the operation lever is rotated from the initial position to the maximum movable range, there are design restrictions such as reducing the sliding-contact surface, enlarging the housing, reducing the window, and reducing a movable range of the operation bracket (the sliding-contact surface portion rotates only between the windows). In such a case, the clutch unit may increase in size, or an operation angle of the operation lever may decrease. According to the clutch unit 100 of the present embodiment, since the sliding-contact surface portion 54*f* (54/1) is also provided at a position overlapping the window 11*h*, it is possible to prevent an increase in size of the clutch unit 100 and to ensure a large operation angle.

In the clutch unit 100 according to the present embodiment, the sliding-contact surface portion 54*f* comes into sliding-contact with the bottom surface 11*a* of the housing 11 outward of the window 11*h* in the radial direction. In the shown example, the sliding-contact surface portion 54*f* has a part 54/3 that is located outward of the window 11*h* in the radial direction and outward of the parts 54/1 and 54/2 in the radial direction.

Since the sliding-contact surface portion 54*f* and the bottom surface 11*a* of the housing 11 can be brought into contact with each other at a position far from the rotation axis X by the part 54/3, it is possible to reduce a force applied to a contact surface between the sliding-contact surface portion 54*f* and the bottom surface 11*a* when the operation lever 21 is operated. Since the part 54/3 of the sliding-contact surface portion 54*f* comes into contact with the bottom surface 11*a* of the housing 11 outward of the window 11*h* in the radial direction, the sliding-contact surface portion 54*f* can normally come into contact with the bottom surface 11*a* of the housing 11 regardless of an operation of the operation lever 21. Accordingly, the operation bracket 54 can be more effectively prevented from coming off the window 11*h* to outside of the housing 11.

In the clutch unit 100 according to the present embodiment, a plurality of sliding-contact portions 54*e* are provided at equal intervals in the circumferential direction of the rotation axis X. In the shown example, three sliding-contact portions 54*e* are provided at intervals of 120 degrees in the circumferential direction of the rotation axis X. A force applied between the operation bracket 54 and the bottom surface 11*a* of the housing 11 when the operation lever 21 is operated can be received in a distributed manner by the three sliding-contact portions 54*e*. Since the operation bracket 54 does not have directionality, workability when the operational bracket 54 is assembled to the housing 11 is improved.

Although the embodiment of the present disclosure has been described above, it is needless to say that the technical scope of the present disclosure should not be construed as being limited by the description of the embodiment. It is understood by those skilled in the art that the present embodiment is merely an example, and various modifications of the embodiment are possible within the scope of the present disclosure described in the claims. The technical scope of the present disclosure should be determined based on the scope of the present disclosure described in the claims and the scope of equivalents thereof.

For example, an example in which the operation bracket 54 engages with the input-side inner ring member 51 has been described in the above-described embodiment, but the operation bracket 54 may engage with the input-side outer ring member 52. In this case, the input-side outer ring member 52 is disposed at a position closer to the bottom surface 11*a* of the housing 11 than is the input-side inner ring member 51.

The present application claims priority based on Japanese Application No. 2021-013325 filed on Jan. 29, 2021, and incorporates all the contents thereof.

INDUSTRIAL APPLICABILITY

In the clutch unit according to the present disclosure, since the facing portion of the operation bracket faces the bottom surface of the housing with the gap therebetween, the facing portion does not contribute to friction between the operation bracket and the housing. Of the fastened portion and the sliding-contact portion extending from the facing portion toward the output-side clutch, the fastened portion penetrates the through hole of the housing, so the fastened portion also does not contribute to the friction between the operation bracket and the housing. Since only the sliding-contact portion comes into sliding-contact with the bottom surface of the housing, a sliding resistance between the housing and the operation bracket is limited.

REFERENCE SIGNS LIST 11 housing
11*a* bottom surface
13 metal bush
21 operation lever
22 operation plate (operation member)
22*b* engagement hole
30 output shaft member
31 pinion gear
32 large-diameter cylindrical portion
33 spline portion
34 small-diameter cylindrical portion
36 stopper ring
40 vehicle seat
50 input-side clutch
51 input-side inner ring member
51*b* protrusion
52 input-side outer ring member
54 operation bracket
54*a* Insertion hole
54*b* fitting hole (engagement portion)
54*c* claw portion (fastened portion)
54*d* facing portion
54*e* sliding-contact portion
54*f* sliding-contact surface portion
54*g* connection portion
55 input-side clutch roller (input-side intermediate transmission member)
56 input-side roller biasing spring
60 output-side clutch
61 output-side inner ring member
62 output-side outer ring member
64 release bracket
65 output-side clutch roller
66 output-side roller biasing spring
70 lock member
100 clutch unit
X rotation axis

The invention claimed is:

1. A clutch unit for use in a vehicle seat, the clutch unit comprising:
   an operation lever that is rotatable about a rotation axis;
   an output shaft member that is rotatable about the rotation axis and outputs, to a vehicle seat, an operation force applied to the operation lever;
   an operation member that rotates together with rotation of the operation lever;
   an input-side clutch that is driven by the operation member;

an output-side clutch that transmits a rotational torque of the input-side clutch to the output shaft member and limits transmission of a rotational torque from the output shaft member to the input-side clutch; and a bottomed cylindrical housing that accommodates at least the input-side clutch, wherein the input-side clutch includes:
- an input-side inner ring member that rotates about the rotation axis;
- an input-side outer ring member that rotates about the rotation axis;
- an input-side intermediate transmission member that is rotatably provided between the input-side inner ring member and the input-side outer ring member, and transmits a rotational torque between the input-side outer ring member and the input-side inner ring member; and an operation bracket that is fastened to the operation member and rotates about the rotation axis together with the operation member, wherein the operation bracket includes:
- an engagement portion that engages with the input-side inner ring member or the input-side outer ring member;
- a facing portion that faces a bottom surface of the housing with a gap therebetween;
- a fastened portion that extends from the facing portion toward the operation member, penetrates a through hole formed in the bottom surface of the housing, and is fastened to the operation member; and
- a sliding-contact portion that extends from the facing portion toward the bottom surface of the housing and comes into sliding-contact with the bottom surface of the housing, wherein the sliding-contact portion includes a sliding-contact surface extending outward in a radial direction of the rotation axis, and wherein a part of the sliding-contact surface overlaps the through hole formed in the bottom surface of the housing when the operation lever is rotated to a maximum movable range.

2. The clutch unit according to claim 1,
wherein the sliding-contact portion extends from an outer end portion of the facing portion in a radial direction of the rotation axis toward the bottom surface of the housing.

3. The clutch unit according to claim 1,
wherein the sliding-contact surface comes into sliding-contact with the bottom surface of the housing outward of the through hole in the radial direction.

4. The clutch unit according to claim 1,
wherein a plurality of sliding-contact portions are provided at equal intervals in a circumferential direction of the rotation axis.

* * * * *